United States Patent [19]

Kubo

[11] Patent Number: 5,307,100
[45] Date of Patent: Apr. 26, 1994

[54] MAGNETIC RECORDING/REPRODUCING APPARATUS FOR A CAMERA HAVING PRESSURE ROLLER

[75] Inventor: Takashi Kubo, Tokyo, Japan

[73] Assignee: Fuji Photo Film Co., Ltd., Kanagawa, Japan

[21] Appl. No.: 75,913

[22] Filed: Jun. 14, 1993

Related U.S. Application Data

[63] Continuation of Ser. No. 761,145, Sep. 17, 1991, abandoned.

[30] Foreign Application Priority Data

Sep. 17, 1990 [JP] Japan .................. 2-97314[U]
May 21, 1991 [JP] Japan .................. 3-45571[U]

[51] Int. Cl.⁵ .................. G03B 17/24; G11B 15/60
[52] U.S. Cl. .................. 354/105; 360/130.3
[58] Field of Search .............. 354/76, 105, 106; 360/130.3, 130.32

[56] References Cited

U.S. PATENT DOCUMENTS

| | | | |
|---|---|---|---|
| 3,218,440 | 11/1965 | Albosta | 360/130.3 X |
| 3,678,212 | 7/1972 | Wild | 360/130.3 X |
| 3,860,961 | 1/1975 | Budrose | 360/130.3 X |
| 3,967,886 | 7/1976 | Komine et al. | 352/29 |
| 4,642,717 | 2/1987 | Matsuda et al. | 360/105 |
| 4,933,780 | 6/1990 | Wash et al. | 360/1 |
| 4,947,196 | 8/1990 | Wash et al. | 354/76 |
| 4,972,213 | 11/1990 | Stoneham et al. | 354/21 |
| 4,996,546 | 2/1991 | Pagano et al. | 354/76 |
| 5,005,031 | 4/1991 | Kelbe | 354/106 |
| 5,016,030 | 5/1991 | Dwyer et al. | 354/76 X |
| 5,028,940 | 7/1991 | Pearson | 354/105 X |
| 5,034,836 | 7/1991 | DeMarti, Jr. et al. | 354/105 X |
| 5,097,278 | 3/1992 | Tammamura et al. | 354/105 |

FOREIGN PATENT DOCUMENTS

| | | | |
|---|---|---|---|
| 435277A2 | 3/1991 | European Pat. Off. | |
| 53-17711 | 2/1978 | Japan | 360/130.32 |
| 54-27621 | 2/1979 | Japan | |
| 55-113168 | 1/1980 | Japan | 360/130.32 |
| 60-57568 | 3/1985 | Japan | 360/230.3 |

OTHER PUBLICATIONS

Brumbaugh et al., "Pressure Roll For Magnetic Stripe Reading Head", Jul. 1973, IBM Technical Disclosure Bulletin vol. 16 No. 2.
Nilsson, "Pressure Adjustment Mechanism", Jul. 1978, IBM Technical Disclosure Bulletin vol. 21 No. 4.

Primary Examiner—M. L. Gellner
Assistant Examiner—J. K. Han
Attorney, Agent, or Firm—Sughrue, Mion, Zinn, Macpeak & Seas

[57] ABSTRACT

A magnetic recording/reproducing apparatus for recording photographing information and print information on a magnetic recording layer formed on the back surface of a photographic film, and reading film information written in the magnetic recording layer. The magnetic recording/reproducing apparatus includes a magnetic head mounted on a film pressure plate, and a pressure roller for bringing the magnetic recording layer of a photographic film in contact with the magnetic head.

14 Claims, 11 Drawing Sheets

MAGNETIC RECORDING/REPRODUCING APPARATUS FOR A CAMERA HAVING PRESSURE ROLLER

This is a continuation of application Ser. No. 07/761,145 filed Sep. 17, 1991 now abandoned.

BACKGROUND OF THE INVENTION

1. Field of the Invention

The present invention relates to a camera equipped with a magnetic recording/reproducing apparatus. More particularly, the present invention relates to a magnetic recording/reproducing apparatus for reading film information from a magnetic recording layer of a photographic film and writing photographing information in the magnetic recording layer.

2. Description of the Related Art

Cameras having a built-in magnetic recording apparatus are described, for example, in International Publications WO 90/04201 and WO 90/04202. In these cameras, film information such as a type of film, film sensitivity, or the like is read from a magnetic recording layer formed on a photographic film and used for photographing, or photographing information is written to the magnetic recording layer. The magnetic recording layer is formed on the base of the photographic film. The thickness of the base of a photographic film is 120 microns or greater which is thicker than that of an ordinary magnetic tape, such as an audio magnetic tape, by about 20 to 30%. Since the photographic film is relatively rigid, it is difficult to obtain good head contact.

In the magnetic recording apparatus described in the above-cited Publications, a magnetic head is mounted on a flexure member to obtain good magnetic head contact with the magnetic recording layer using the elasticity of the flexure member and the rigidity of the photographic film. Alternatively, a pad for receiving a photographing film is mounted facing the magnetic head to obtain good magnetic head contact.

In the case of the magnetic recording apparatus having a magnetic head mounted on the flexure member, it is difficult to obtain good head contact because the head touch changes with the curling of a photographic film. The rigidity of photographic film changes with environmental conditions (e.g., temperature, humidity), and with the type and thickness of the base of the photographic film. Moreover, when the magnetic head is applied to the photographic film with a light pressure by the flexure member, the magnetic head likely will vibrate because of friction with the advancing photographic film, thereby causing poor reliability in data reading and writing. On the other hand, in the case where the magnetic recording apparatus tightly sandwiches a photographic film between a pad and the magnetic head, a large friction is generated with the advancing photographic film so that the load of a film transport motor is relatively large.

SUMMARY OF THE INVENTION

It is therefore an object of the present invention to provide a magnetic recording/reproducing apparatus for a camera which is capable of obtaining good head contact with a photographic film irrespective of a change in mechanical stress of the photographic film or a change in rigidity caused by a change in environmental conditions.

It is another object of the present invention to provide a magnetic recording/reproducing apparatus for a camera capable of obtaining good head contact while ensuring smooth film transport.

It is a further object of the present invention to provide a magnetic recording/reproducing apparatus for a camera capable of suppressing a signal change between data read and data write operations.

The above and other objects of the present invention can be achieved by rotatably supporting a magnetic head on a shaft which is parallel to the film advancement direction, and by pressing a photographic film toward the magnetic head using a pressure roller which is arranged to push the photographic film toward the magnetic head. According to an embodiment of the present invention, the magnetic head is mounted on a film pressure plate. According to another preferred embodiment of the present invention, the pressure roller is displaced from the apex of the cylindrical head surface of the magnetic head to push the photographic film toward the magnetic head.

According to the present invention, the pressure roller is biased by a spring to push the photographic film toward the magnetic head. As a result, good head contact can be obtained even if the rigidity of the photographic film changes, thereby avoiding errors during data reading and writing.

BRIEF DESCRIPTION OF THE DRAWINGS

The above and other objects and advantages of the present invention will be more clearly understood from the following detailed description of preferred embodiments in connection with the accompanying drawings, wherein.

DETAILED DESCRIPTION OF THE PREFERRED EMBODIMENTS

Figure 1:
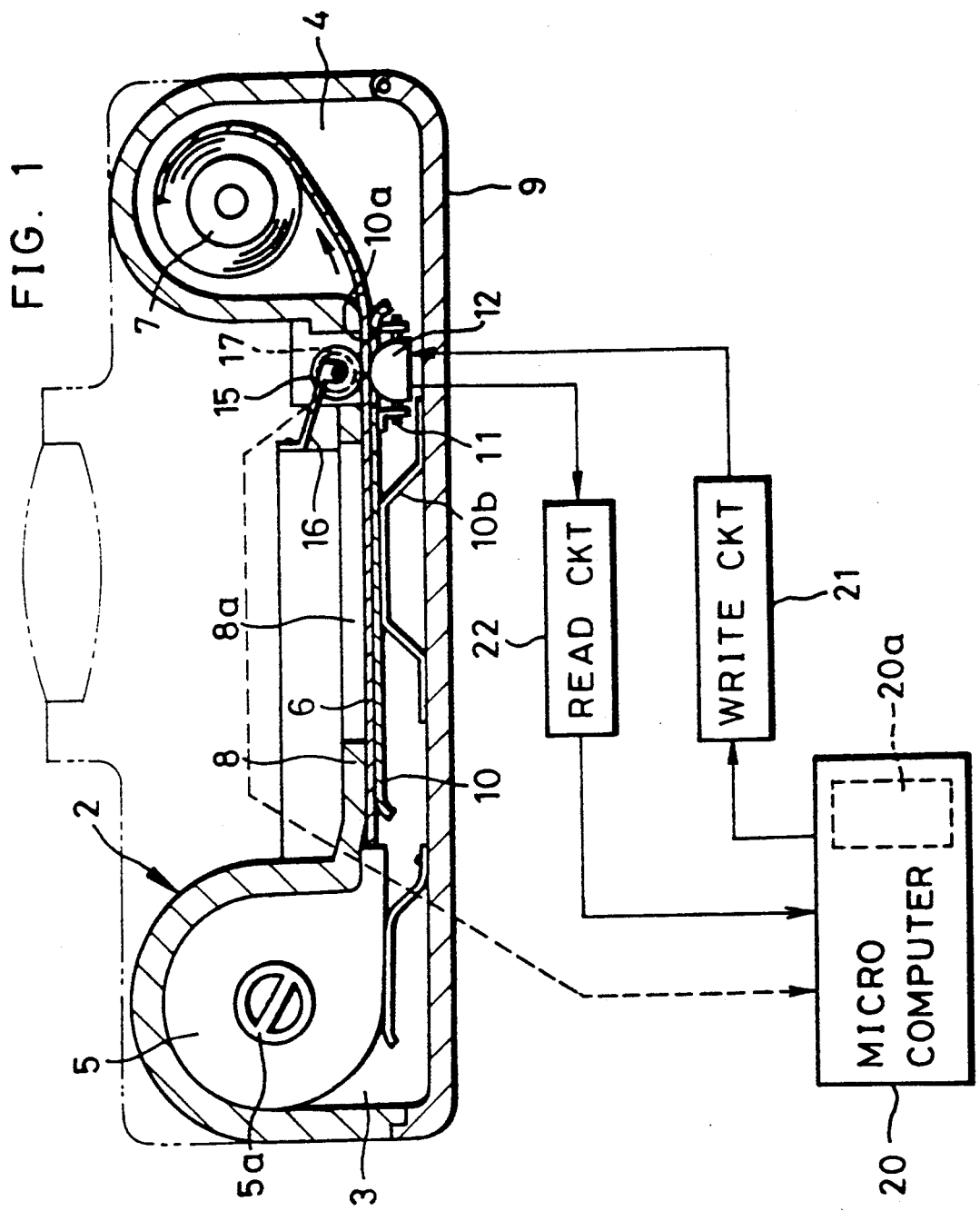
FIG. 1 is a schematic diagram showing a lateral cross section of a camera according to a first embodiment of the present invention.
Figure 2:
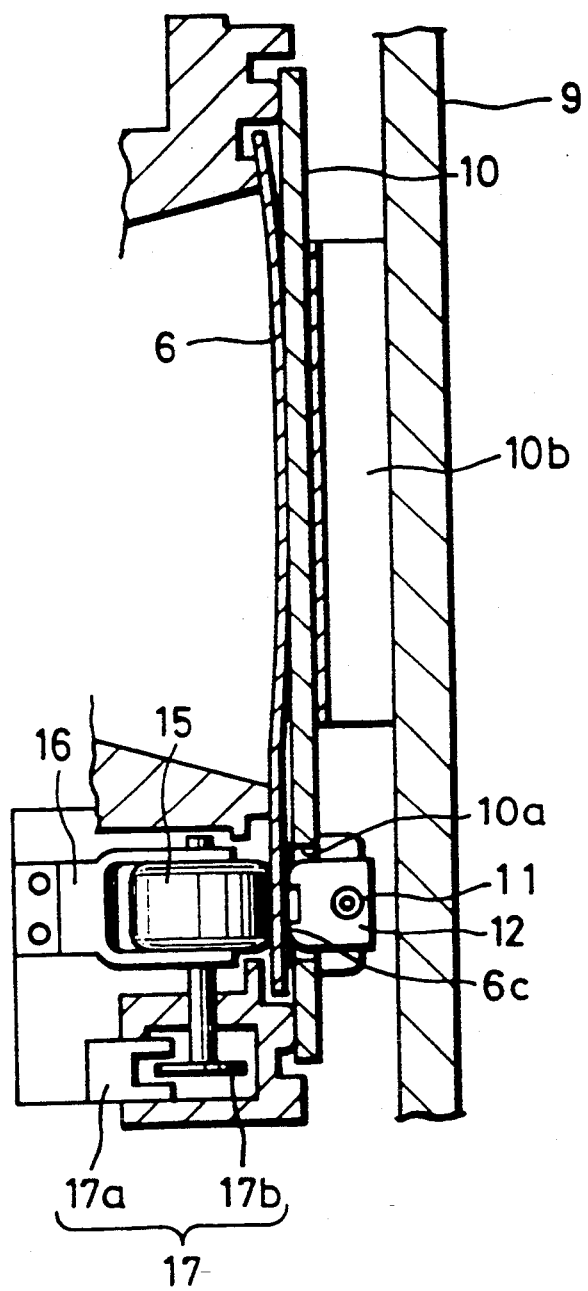
FIG. 2 is a vertical section showing a main portion of the camera shown in FIG. 1.

FIGS. 1 and 2 illustrate a camera according to a first embodiment of the present invention.

A cassette housing chamber 3 for housing a cassette 5, and a film take-up chamber 4, having a take-up spool 7 therein are formed within a camera body 2. Photographic film 6, which is pulled out of the cassette 5, is wound onto the take-up spool 7. The photographic film 6 is constituted by a plastic base 6a, a photosensitive emulsion layer 6b formed on one side of the base 6a, and a magnetic recording layer 6c formed on the other side of the base 6a (see FIG. 8). An aperture frame 8, having an exposure aperture 8a which defines a frame size, is mounted between the cassette housing chamber 3 and the film take-up chamber 4. The photographic film 6 is positioned at the back of the aperture frame 8, and is pushed by a film pressure plate 10 towards the aperture frame 8. The film pressure plate is mounted on a back door 9 by a spring plate 10b.

A magnetic head 12 is mounted rotatably on a shaft 11. The shaft 11 extends parallel to the transport direction of the photographic film 6 and is supported by two plates mounted on the film pressure plate 10. The head surface of the magnetic head 12 enters an opening 10a in the film pressure plate 10 to expose the head surface to the photographic film 6. Hence, the head surface of the magnetic head 12 comes in contact with the magnetic recording layer 6c for reading and writing digital data. As illustrated in FIG. 2, the magnetic recording layer 6c can be coated on the photographic film 6 in the shape of a stripe.

Film information which is read or reproduced from the magnetic recording layer 6c includes, for example, the type of film, film sensitivity and frame number. Photographing information which is written or recorded in the magnetic recording layer 6c includes, for example, a subject color temperature, brightness, contrast, subject distance, flash light amount, shutter speed, f-number and trimming print data which are described in Japanese Patent Laid-open Publication No. 54-26721. The magnetic recording layer 6c also can be used for writing print information during printing.

A pressure roller 15 is mounted so as to sandwich the photographic film 6 between the magnetic head 12 and the pressure roller 15. The pressure roller 15 is supported rotatably by a bracket 16 made of a spring plate so as to push the pressure roller 15 toward the surface of the photographing film 6. In order to place the magnetic recording layer 6c in contact with the head surface of the magnetic head, the pressure roller 15 pushes the magnetic recording layer 6c from the photosensitive emulsion layer 6b side toward the magnetic head 12.

The pressure roller 15 also rotates as the photographic film 6 is advanced. The rotation of the pressure roller 15 is detected by an encoder 17 which is constructed of a photosensor 17a and an encode plate 17b which rotates with the pressure roller 15. A number of slits, through which light passes, are radially formed in the encode plate 17b at a predetermined pitch. The light passing through each slit is photoelectrically detected by the photosensor 17a. A signal output from the photosensor 17a is sent to a microcomputer 20 to identify a film advance speed signal. The microcomputer 20 activates a write circuit 21 and a read circuit 22 in accordance with the film advance speed signal, so that the data read/write is carried out synchronously with the speed with which the film advances.

Next, the operation of the present embodiment will be described.

When the cassette 5 is set in the cassette housing chamber 3 and the back door 9 is closed, the spool shaft 5a of the cassette 5 starts rotating. As the spool shaft 5a rotates, a leader of the photographic film 6 is advanced out of the cassette 5, transported toward the film take-up chamber 4 between the film pressure plate 10 and the aperture frame 8, and caught by the take-up spool 7. After the film leader of the photographic file 6 is caught by the take-up spool 7, the spool shaft 5a spins freely, and the photographic 6 is advanced by the rotation of the film take-up spool 7. Accordingly, the photographic film 6 is wound on the outer periphery of the take-up spool 7.

While the film leader of the photographic film 6 is advanced, the read circuit 22 is operated so that the magnetic head 12 reads the film information such as film type data, film sensitivity data, and the like, which are written respectively beforehand in the magnetic recording layer 6c on the leader. The film information read together with the film advance speed signal from the encoder 17 are input to the microcomputer 20. The film advance speed tends to fluctuate depending upon the roll diameter of the photographic film 6 on the take-up spool 7 and the consumed power of a power source battery. Nevertheless, since the film advance speed signal from the encoder 17 is taken into consideration, the magnetic head 12 can read information accurately from the magnetic recording layer. The information read is then converted and stored in a memory 20a.

As the photographic film 6 is advanced further, the frame number data and film sensitivity data are read by the magnetic head 12 and are input to the microcomputer 20. Since the film sensitivity data has a great influence on the exposure control, the film sensitivity data is written previously in the magnetic recording layer 6c of each frame of the photographic film 6 together with the frame number data. Once the first frame number data is read, advancing of the film is stopped. The film sensitivity data corresponding to the first frame is compared with the film sensitivity data read from the film leader.

While various data are read from the magnetic recording layer 6c as the photographic film 6 is advanced, the pressure roller 15 rotates dependent on advancing the photographic film 6 and pushes the photographic film 6 from the photosensitive emulsion layer 6b side toward the head surface of the magnetic head 12 by virtue of the elasticity of the bracket 16. In this manner, the head surface of the magnetic head 12 and the magnetic recording layer 6c are maintained in constant contact irrespective of any variations in rigidity of photographic film, and changes in rigidity of the photographic film caused by the fluctuation of environmental conditions, such as temperature and humidity. Furthermore, as shown in FIG. 1, the pressure roller 15 rotates as the photographic film 6 is advanced and the bracket 16 can retract from the surface of the photographic film 6. Therefore, the pressure roller 15 will not generate an excessive load on a film transport motor when the film is being advanced.

Figure 3:
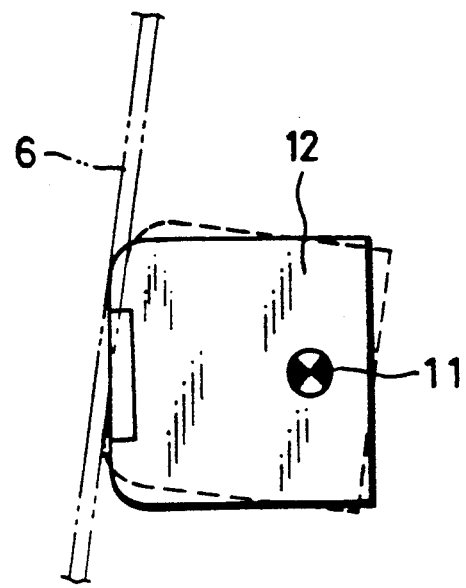
FIG. 3 is a view showing the operation of a magnetic head.

As shown in FIG. 3, the magnetic head 12 is arranged to be rotatable about the shaft 11 which is parallel to the direction in which the photographic film 6 is advanced and perpendicular to the direction of a head gap between magnetic poles of the magnetic head 12. Therefore, even if the photographic film 6 has a deformed portion which causes the photographic film 6 to contact the magnetic head 12 obliquely relative to the magnetic head 12, the magnetic head 12 swings so as to face the film surface correctly as shown in FIG. 3. In this manner, good head contact can be obtained over the entire width of the photographic film 6, thereby facilitating correct reading of data from the magnetic recording layer 6c.

The present invention is also applicable to a prewind type camera wherein the photographic film 6 is first completely pulled out of the cassette 5 and wound on the take-up spool 7, and thereafter the photographic film 6 is rewound on the cassette 5 each time an image is taken on a frame. In such a case, the magnetic recording/reproducing apparatus may be disposed at the side of the cassette housing chamber 3.

After an image is taken in the first frame, photographing information is recorded on the magnetic recording layer 6c. The photographing information includes data relating to the use of an electronic flash, shutter speed, f-stop, and the like. This data is written or recorded while the second frame is advanced to the back of the exposure aperture 8a. While this data is being written, the film advance speed signal from the encoder 17 is monitored by the microcomputer 20 so that the write circuit 21 can be synchronously operated in accordance with the film advance speed. Alternatively, data can be written in the magnetic recording layer 6c at a predetermined bit length irrespective of a change in the film advance speed.

In the first embodiment, the magnetic recording layer 6c is formed in the shape of a stripe on the back surface of the photographing film 6 in an area outside of the imaging area. Alternatively, the magnetic recording layer may be formed on the entire back surface of the photographic film 6, in which case a transparent magnetic recording layer is used so as not to obstruct the recording of an image within a frame. Such a transparent magnetic recording layer may be formed by coating magnetic material which contains a reduced amount of magnetic substance thinly on the back surface of the photographing film 6.

Figure 4:
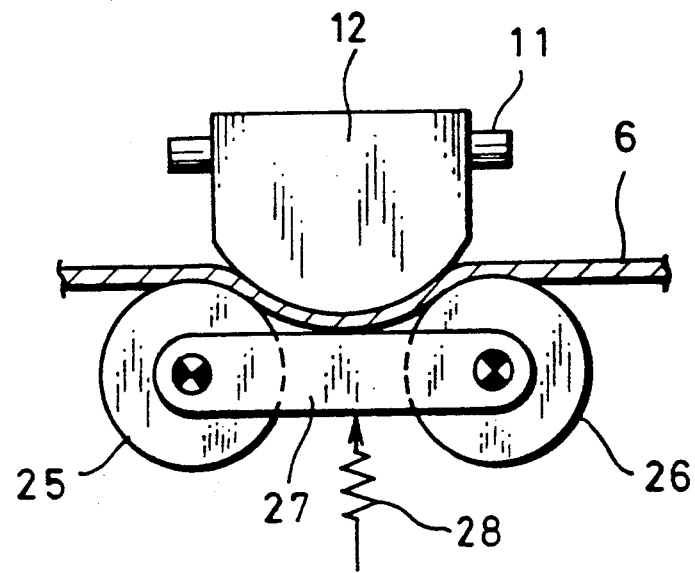
FIG. 4 is a schematic diagram showing a second embodiment of the present invention which uses two pressure rollers.
Figure 5:
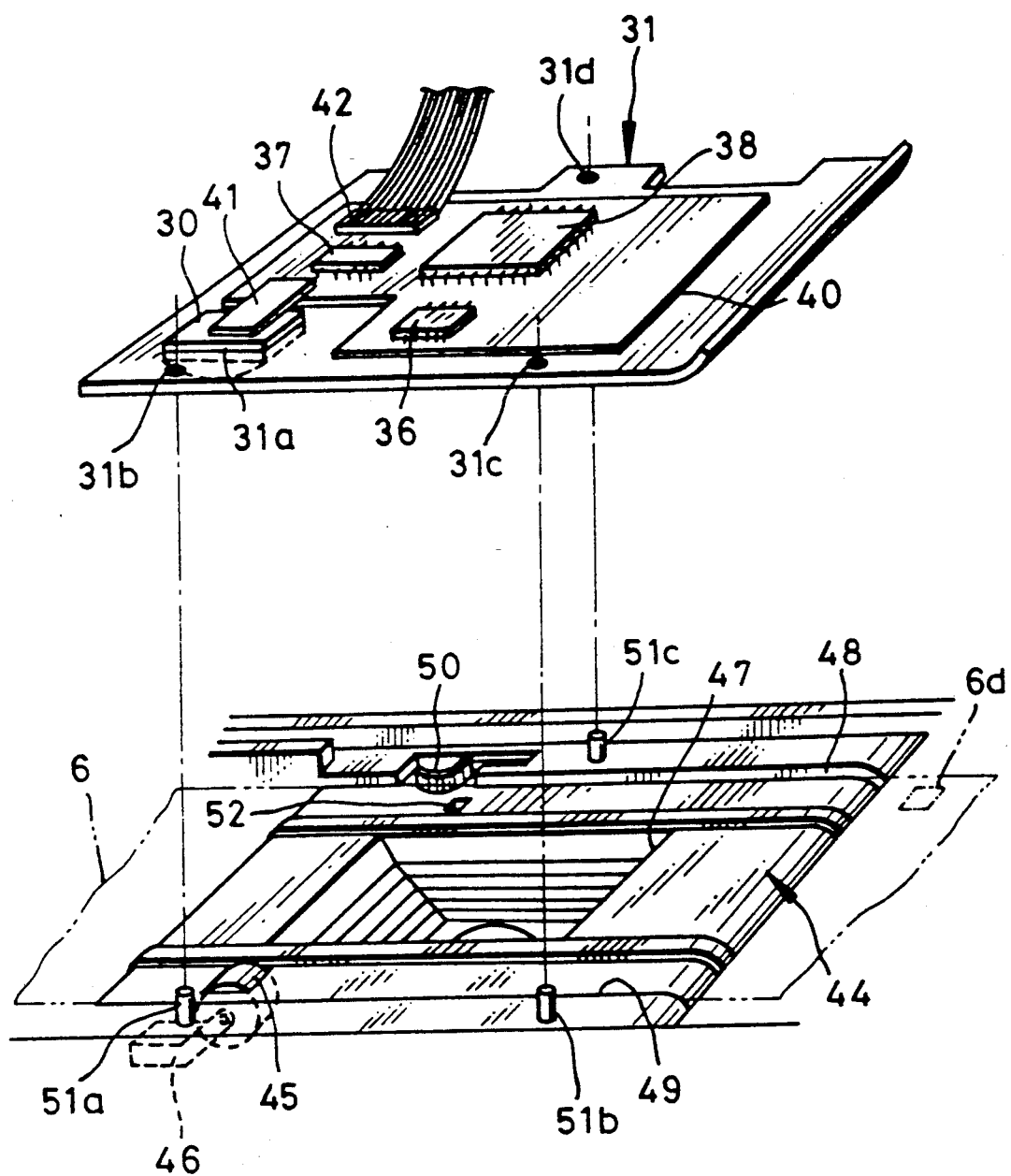
FIG. 5 is an exploded perspective view showing a main portion of a camera according to a third embodiment of the present invention.
Figure 6:
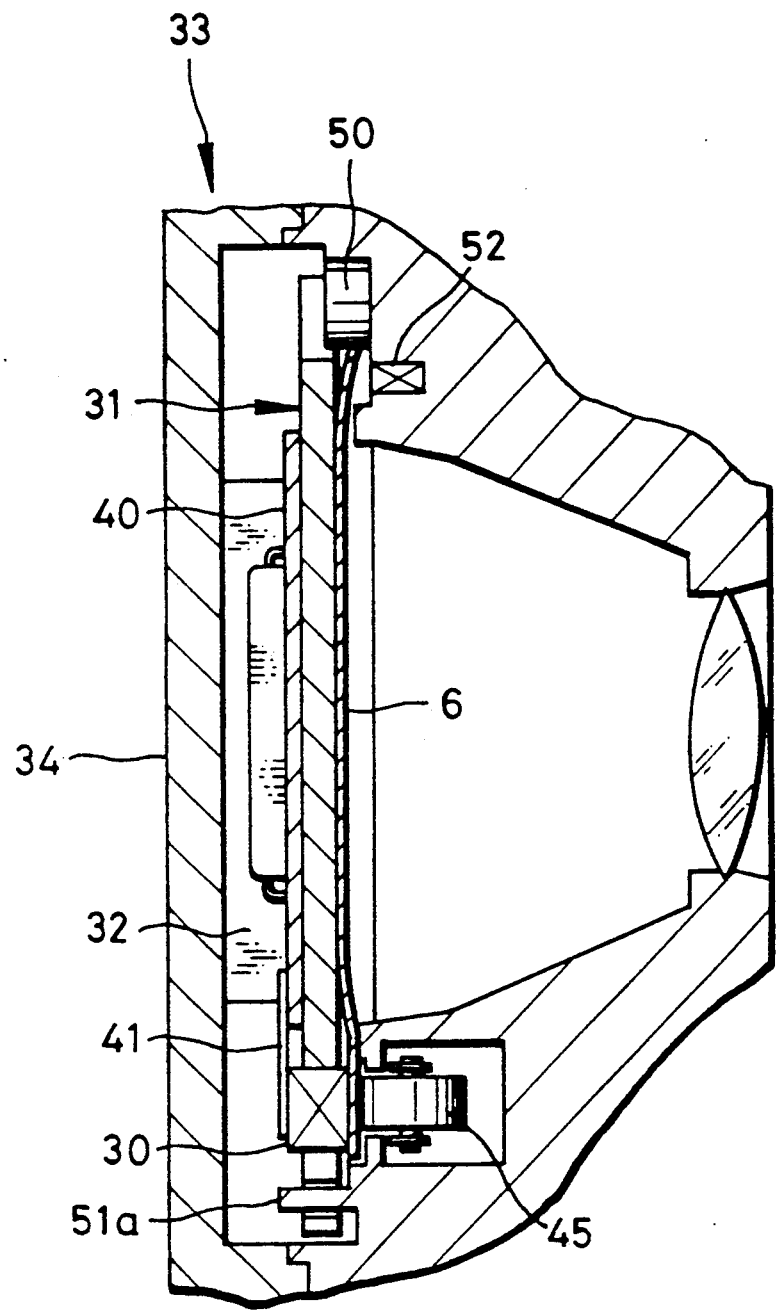
FIG. 6 is a vertical section of the camera shown in FIG. 5.

FIG. 4 shows a second embodiment of the present invention which uses a pair of pressure rollers 25 and 26. The two pressure rollers 25 and 26 are rotatably disposed with a proper distance therebetween and are supported by a support arm 27. The photographic film 6 will thus curve in the shape of the head surface of the magnetic head 12 as shown, thereby ensuring a reliable head contact. A spring 28 is used to bias the support arm 27 such that the photographic film 6 is pushed against the magnetic head 12 by the pressure rollers 25 and 26.

FIGS. 5 to 8 show a third embodiment of the present invention wherein the center of the pressure roller is slightly displaced from the center of a magnetic head. A magnetic head 30 is fitted in an opening 31a formed in a film pressure plate 31, and fixedly attached to the film pressure plate 31 by adhesive agent or the like. The film pressure plate 31 is mounted on a back door 34 by means of a spring plate 32. The back door 34 is pivotably mounted on a camera body 33. The mounting precision of the magnetic head 30 on the film pressure plate 31 is very precise, for example, within a range of ±0.05 mm. The slant angle precision between the film pressure plate 31 and magnetic head 30 is maintained for example, within ±5 minutes.

A printed circuit board 40 is mounted on the back of the film pressure plate 31. A head driver IC 36, a reproducing amplifier IC 37, a modulation/demodulation IC 38, and other circuit components are mounted on the printed circuit board 40. The printed circuit board 40 is also provided with a head connection terminal (not shown) in which a first terminal group (not shown) of a small printed circuit board 41 is connected (e.g., soldered). A second terminal group (not shown) of the small printed circuit board 41 is connected to a terminal group (not shown) of the magnetic head 30. The printed circuit board 40 and a main CPU (not shown) in the camera body 33 are interconnected by a connector 42 so that the main CPU controls the read/write sequence of the magnetic head 30 and executes other processes.

Figure 8:
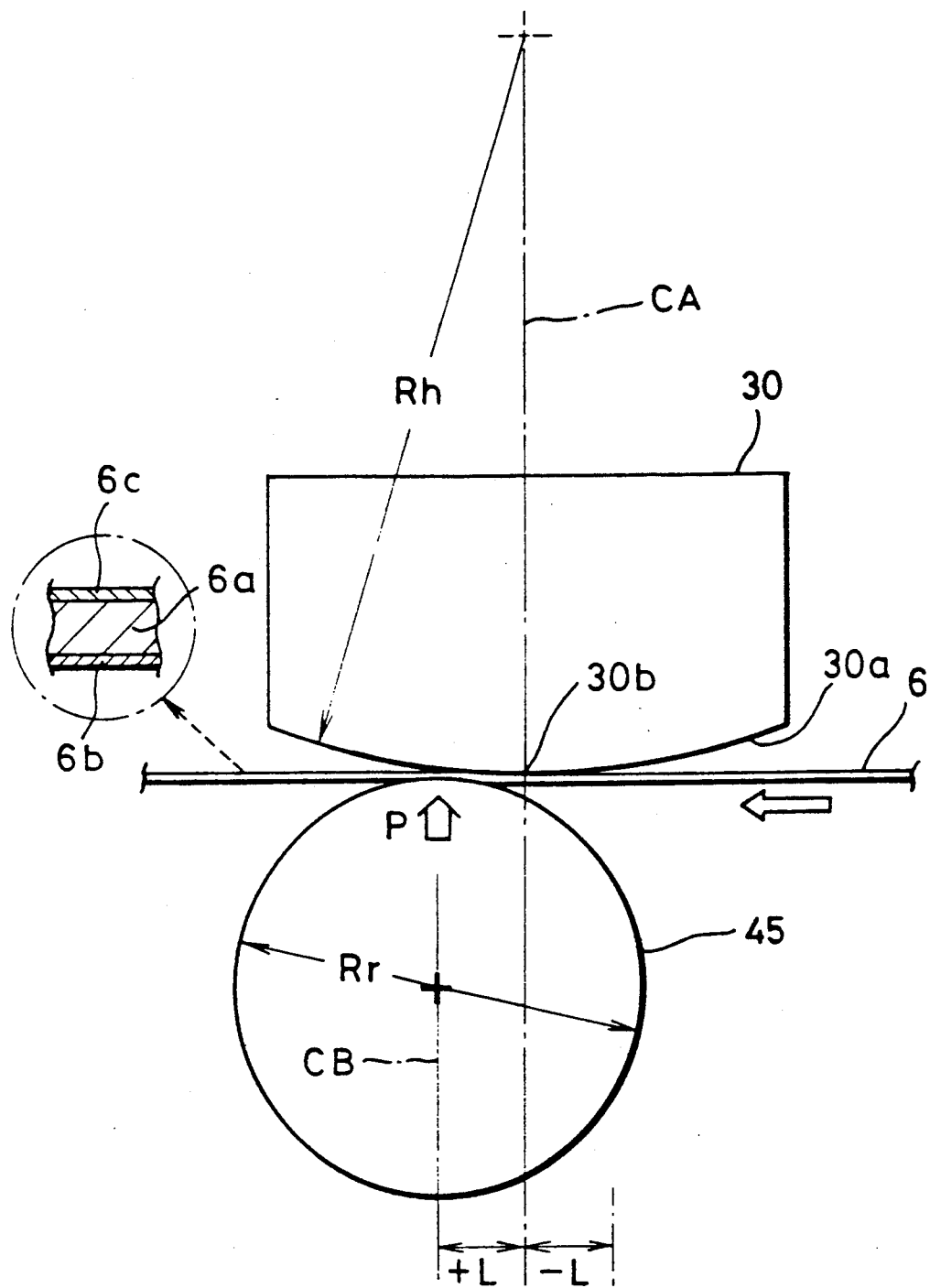
FIG. 8 is a view showing a positional relationship between a magnetic head and a pressure roller.

On the film passageway 44 side, a pressure roller 45 is supported by an elastic bracket 46 and is mounted in a position facing to the magnetic head 30. As shown in FIG. 8, the center line CB of the pressure roller 45 is displaced by a distance L from the center line CA of the magnetic head 30 either to the downstream side or upstream side in the film advance direction, to push the photographic film 6 toward the magnetic head 30. Thus, the photographic film 6 comes in contact with the apex 30b of the magnetic head 30 because of the elasticity of the photographic film 6 itself. The center line CA passes through the apex 30b of the head surface 30a and is perpendicular to the film advance direction. Similarly, the center line CB is perpendicular to the film advance direction.

The upper and lower sides of the film passageway 44 are defined by two film guides 48 and 49 disposed on opposing sides of an exposure aperture 47. A spring member 50 is provided on the film guide 48 to push the photographic film 6 toward the other film guide 49. With this arrangement, the photographic film 6 is advanced without displacement in the width-wise direction so that the magnetic recording layer 6c of the photographic film 6 can correctly contact the head surface of the magnetic head 30.

Figure 7:
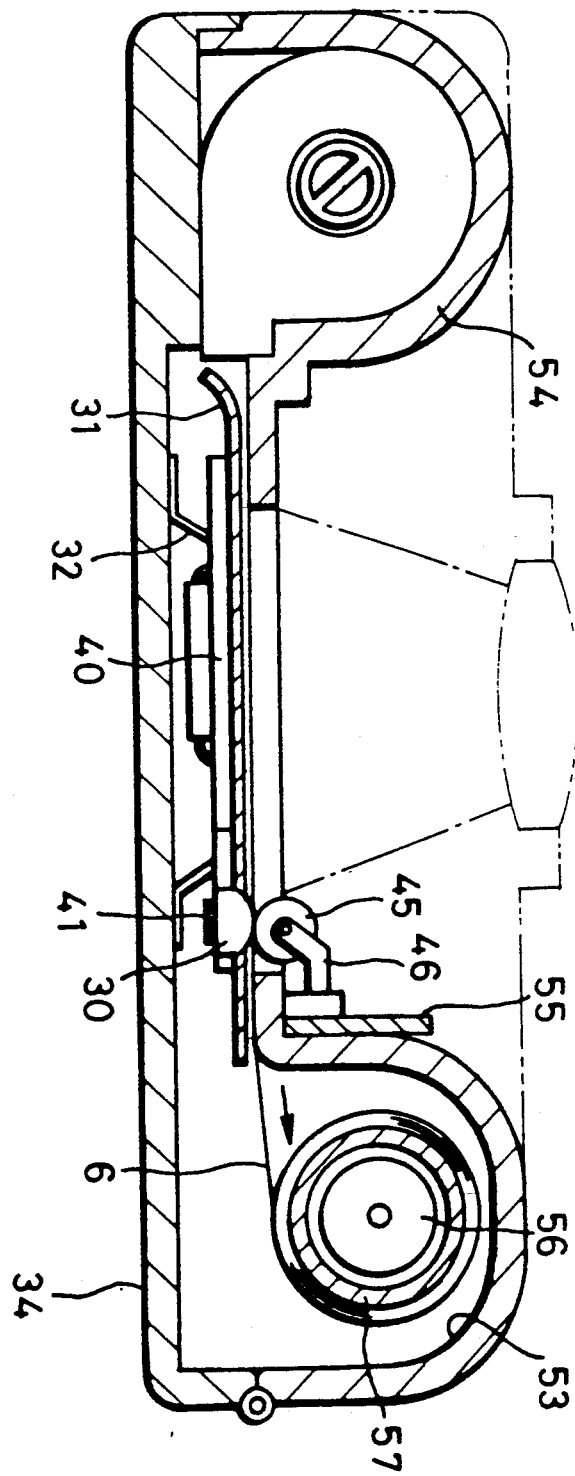
FIG. 7 is a lateral cross section of the camera shown in FIG. 5.

Guide holes 31b, 31c and 31d are formed in the pressure plate 31. Guide pins 51a, 51b and 51c mounted on the camera body 33 outside the film guides 48 and 49 are inserted in the guide holes 31b, 31c and 31d, so that the film pressure plate 31 is constrained from moving in the vertical and horizontal directions. Therefore, the magnetic head 30 is held in a predetermined position relative to the pressure roller 45. A photosensor 52 detects a frame by detecting a perforation 6d provided for each frame to position each frame. As shown in FIG. 7, an electromagnetic shield plate 55 made of Cu, Al, ferrite, or the like, is provided near a film take-up chamber 53, so that electromagnetic noise from a motor 56 housed within a take-up spool 57 is prevented from being induced to the magnetic head 30.

Figure 9:
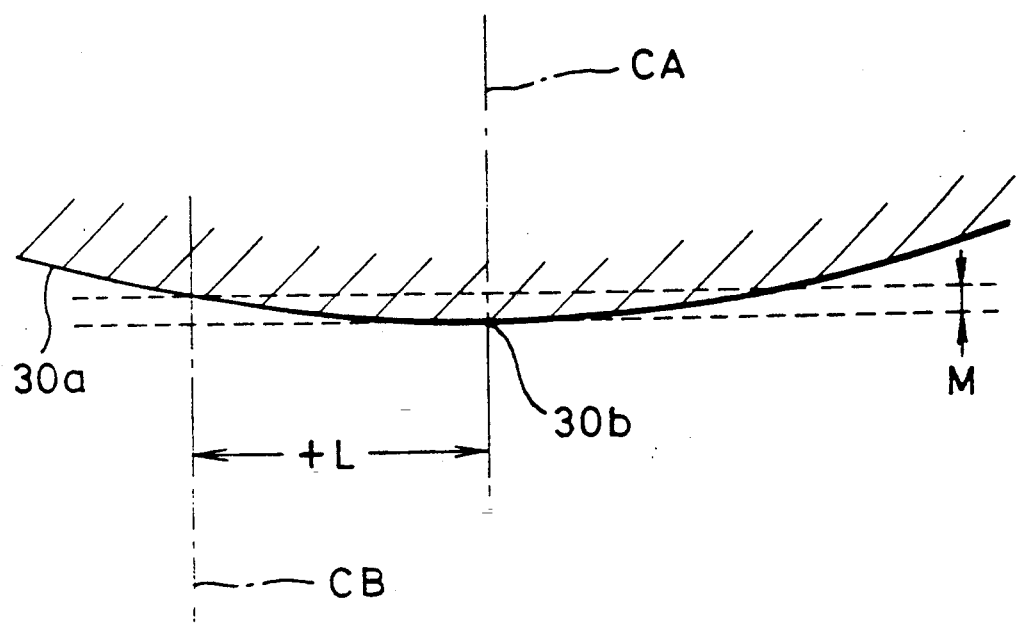
FIG. 9 is a view showing the head surface of a magnetic head.

A signal to noise ratio (S/N) of a read signal should be 30 dB or more to ensure high reliability of a digital data read/write system. Furthermore, in order to ensure compatibility between apparatuses, a read signal mechanical loss of 2 dB or less is required. The conditions necessary for keeping the signal change at 2 dB or smaller have been investigated. FIGS. 8 and 9 show the positional relationship between the magnetic head 30 and the pressure roller 45, the head surface 30a of the magnetic head 30 has a cylindrical shape extending in the width-wise direction of the photographic film 6. The radius of curvature of the head surface 30a, and the diameter of the pressure roller 45 are represented by Rh (mm) and Rr (mm), respectively. A distance L (mm) separates the center line CA passing the apex 30b of the head surface 30a and perpendicular to the film advance direction, and the center line CB passing the center of the pressure roller 45 and perpendicular to the film advance direction. The pressure of the pressure roller 45 against the head surface 30a is represented by P (g). A distance M (mm) in the direction perpendicular to the film advance direction separates intersections of the head surface 30a with the center lines CA and CB.

The ratios of a write signal to a read signal by the magnetic head 30 were measured by while varying Rh, Rr, L, P, and M respectively. The measured results are shown in FIGS. 10 to 14. The value "O" of the relative output ratio indicates a case in which a write signal and a read signal are the same, whereas a minus sign of the relative output ratio shows that a read signal is smaller than a write signal. The photographic film used for such measurement had as its base a cellulose triacetate film having a thickness of 122 microns, and magnetic coating liquid was coated at a thickness of 5 microns over the whole surface on a back side thereof. The magnetic liquid was obtained by dispersing acicular magnetic substance (850 Oe, BET surface area 40 $M^2/g$ measured according to the Brunauer-Emmett-Taylor method) of 10 parts by weight into a binding agent composed of vinyl acetate copolymer type acrylate of 60 parts by weight and urethane acrylate of 40 parts by weight. The magnetic head 30 used was a permalloy head having a cylindrical shape of the head surface 30a and a gap length of 5 microns. Write signals were measured at the recording density of 500 BPI (bit/inch), and read signals were measured at a read speed of 30 mm/sec.

Figure 10:
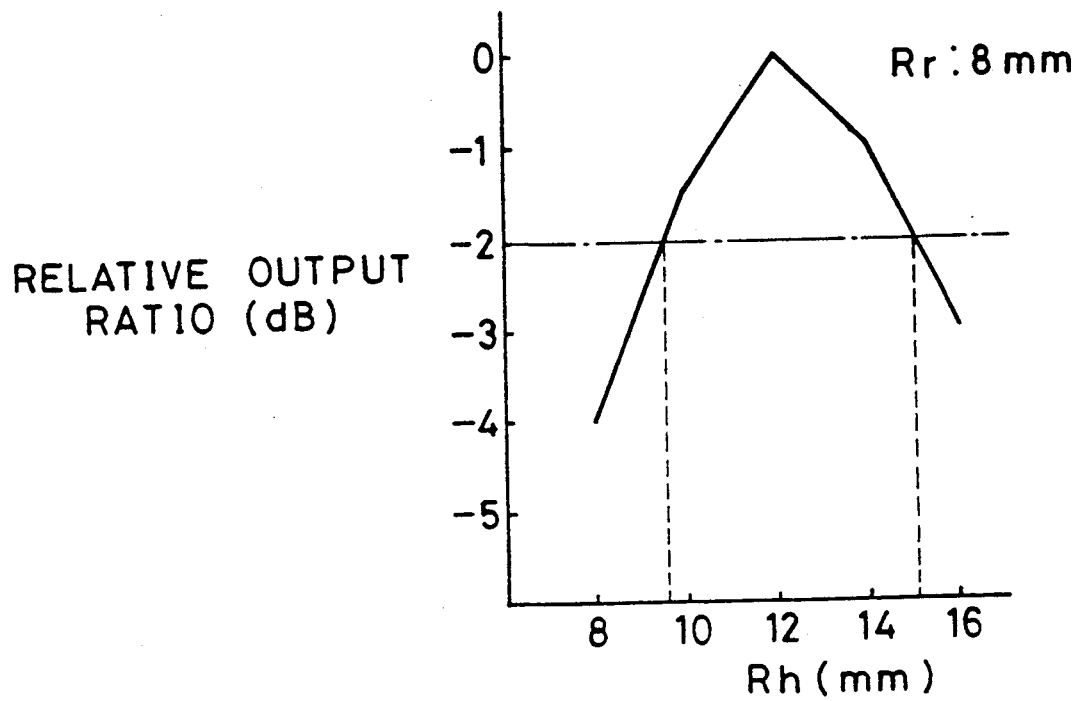
FIG. 10 is a graph showing a relationship between a relative output ratio of a magnetic head and the radius Rh of curvature of the head surface of the magnetic head.
Figure 11:
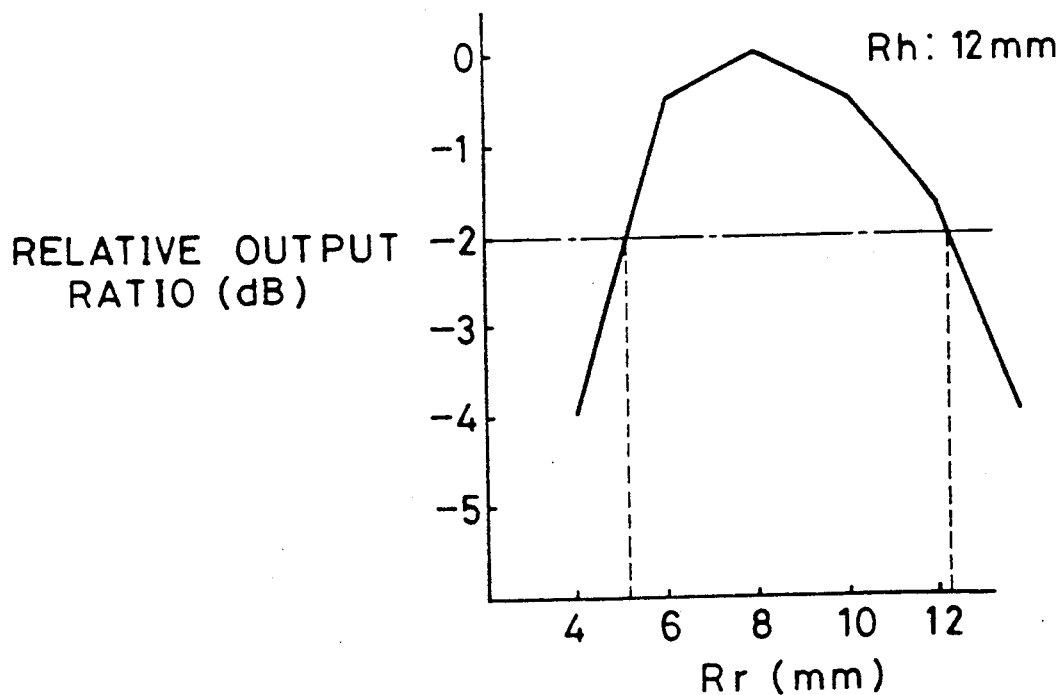
FIG. 11 is a graph showing a relationship between a relative output ratio of a magnetic head and the diameter Rr of a pressure roller.
Figure 12:
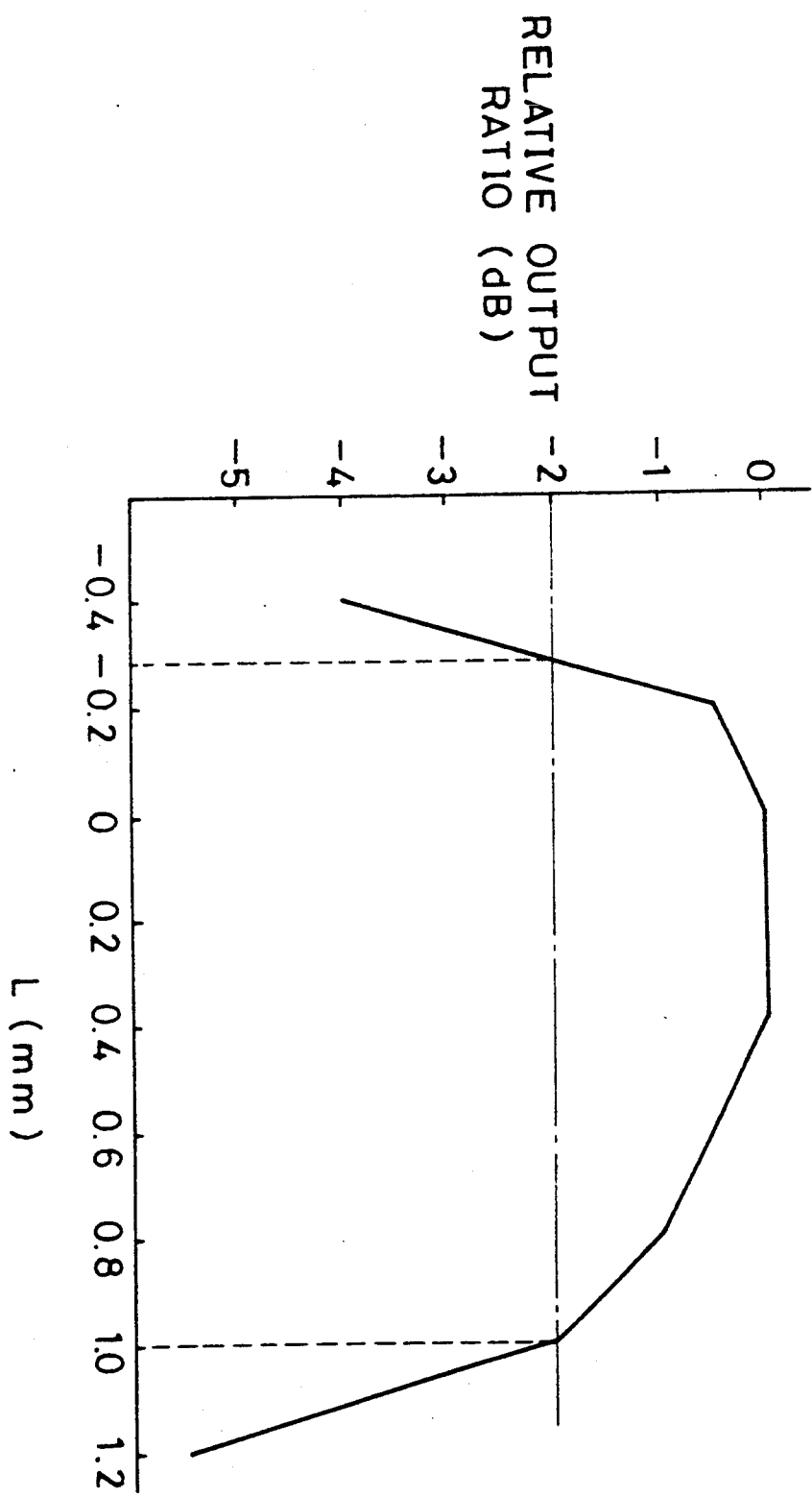
FIG. 12 is a graph showing a relationship between a relative output ratio of a magnetic head and a displacement amount L.
Figure 13:
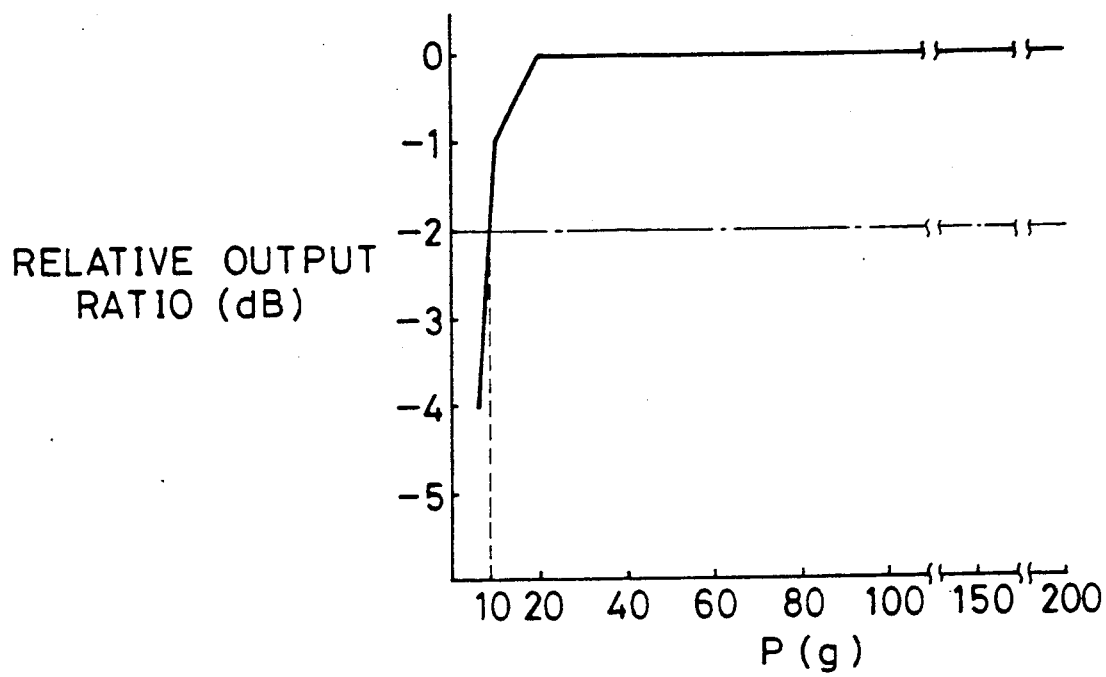
FIG. 13 is a graph showing a relationship between a relative output ratio of a magnetic head and the pressure of a pressure roller.
Figure 14:
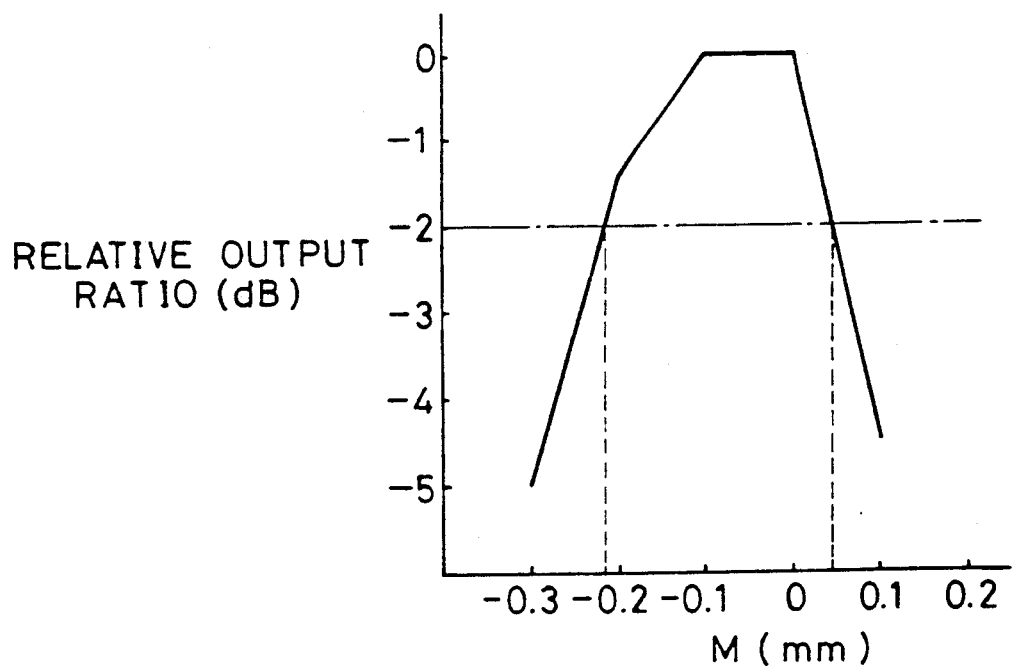
FIG. 14 is a graph showing a relationship between a relative output ratio and a distance M.

As seen from FIG. 10, a relative output ratio of 2 dB or smaller was obtained under conditions in which the diameter Rr is 8 mm and the radius Rh of curvature is within a range from 10 mm to 15 mm. As seen from FIG. 11, a relative output ratio of 2 dB or smaller was obtained under conditions in which the radius Rh of curvature is 12 mm and the diameter Rr is within a range from 5 mm to 12 mm. As seen from FIG. 12, a relative output ratio of 2 dB or smaller was obtained under conditions in which the displacement amount is within a range from −0.2 mm to +1.0 mm (+ represents the downstream side in the film advance direction, and represents the upstream). As seen from FIGS. 13 and 14, it was found that the pressure P is preferably 10 g to 100 g, and M is preferably 0 mm to 0.2 mm. Although the pressure p may be over 10 g as illustrated in FIG. 13, the pressure P is preferably as small as possible from so as to minimize the load on the film transport motor while the film is being advanced. The pressure 10 g or smaller is required when the film cassette is of the type that the film leader is advanced out of the cassette by the rotation of the spool.

In the above embodiments, read/write control is carried out synchronously with the rotation of the pressure roller. Instead, read/write control may be carried out by reading bit signals written in the magnetic recording layer at a predetermined pitch. The pressure roller may also be driven by a motor which may be used to advance the photographic film.

Many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, the invention is not limited to the exact construction and operation illustrated and described. Accordingly, all suitable modifications and equivalents may be utilized without departing from the true spirit and scope of the invention as defined by the appended claims.

What is claimed is:

1. A camera having a magnetic head for magnetically reading and writing information while a head surface of the magnetic head is in contact with a magnetic recording layer of photographic film, said camera comprising;
   supporting means for supporting the magnetic head; and
   two pressure rollers disposed opposite respective side portions of said head surface so as to press the photographic film against magnetic head, the photographic film being in contacting relation to substantially the entire head surface of the magnetic head, said two pressure rollers being spaced apart from each other by a predetermined distance.

2. A camera according to claim 1, wherein said camera further comprises magnetic shielding means disposed between said film take-up chamber and said magnetic head for shielding said magnetic head from a magnetic field generated a motor mounted within said film take-up chamber.

3. A camera having a magnetic head for magnetically reading and writing information while a head surface of said magnetic head is in contact with a magnetic recording layer of a photographic film, said camera comprising:
   a support shaft, said magnetic head being rotatably mounted on said support shaft;
   at least one pressure roller rotatably contacting said photographic film and being disposed in opposition to said magnetic head so as to push the photographic film toward said magnetic head and maintain contact between said magnetic head and said photographic film; and
   an encoder coupled to said pressure roller so as to be driven by rotation of said pressure roller and generate a pulse each time said photographic film is advanced by a predetermined amount.

4. A camera having a magnetic head for magnetically reading and writing information while a head surface of said magnetic head is in contact with a magnetic recording layer of a photographic film, said camera comprising:
   a cassette housing chamber defined in said camera and adapted to receiving a cassette containing the said photographic film;
   a film take-up chamber defined in said camera and adapted to receiving portions of said photographic film which have been pulled out of said cassette;
   a motor disposed in said film take-up chamber for pulling said film out of said cassette;
   a film passageway defined in said camera and extending between said cassette housing chamber and said film take-up chamber;
   an exposure aperture formed in said camera so as to communicate with said film passageway;
   a film pressure plate disposed in said film passageway and in opposition to said exposure aperture, said photographic film being supported on said film pressure plate;
   a spring plate, mounted on a portion of said pressure plate which is proximate a side portion of said exposure aperture, said spring plate extending in the direction of advancement of said photographic film;

at least one pressure roller mounted on said spring plate in opposition to said magnetic head so as to press said magnetic recording layer into contact with said head surface, said head surface being arcuate in cross section; and magnetic shielding means disposed between said film take-up chamber and said magnetic head so as to shield said magnetic head from a magnetic field generated by said motor.

5. A camera having a magnetic head for magnetically reading and writing information while an arcuate head surface of said magnetic head is in contact with a magnetic recording layer of a photographic film, said camera comprising:

a cassette housing chamber defined in said camera and adapted to receiving a cassette containing the said photographic film;

a film take-up chamber defined in said camera and adapted to receiving portions of said photographic film which have been pulled out of said cassette;

a film passageway defined in said camera and extending between said cassette housing chamber and said film take-up chamber;

an exposure aperture formed in said camera so as to communicate with said film passageway;

a film pressure plate disposed in said film passageway and in opposition to said exposure aperture, said photographic film being supported on said film pressure plate, said magnetic head being mounted on said film pressure plate;

at least one pressure roller disposed in opposition to said magnetic head so as to press said magnetic recording layer into contact with said head surface, the centerline of said magnetic head being offset, in the direction of advancement of said photographic film, with respect to the centerline of said pressure roller;

said camera being configured so as to satisfy the following equations;

$$10 \text{ mm} \leq Rh \leq 15 \text{ mm},$$

$$5 \text{ mm} \leq Rr \leq 12 \text{ mm},$$

$$-0.2 \text{ mm} \leq L \leq 1.0 \text{ mm}$$

(wherein + corresponds to a position in the downstream direction with respect to the direction of advancement of said photographic film and − corresponds to an upstream direction), and $$10 \text{ g} \leq P \leq 100 \text{ g},$$

wherein Rh is the radius of curvature of said head surface, Rr is the diameter of said pressure roller, P is a pressure at which said pressure roller is placed in contact with said head surface and L is a distance of displacement, in the direction of advancement of the photographic film, between the centerline of said magnetic head and the centerline of said pressure roller.

6. A camera having a magnetic head for magnetically reading and writing information while an arcuate head surface of said magnetic head is in contact with a magnetic recording layer of a photographic film, said camera comprising:

a cassette housing chamber defined in said camera and adapted to receiving a cassette containing said photographic film;

a film take-up chamber defined in said camera and adapted to receiving portions of said photographic film which have been pulled out of said cassette;

a film passageway defined in said camera and extending between said cassette housing chamber and said film take-up chamber;

an exposure aperture formed in said camera so as to communicate with said film passageway;

a film pressure plate disposed in said film passageway and in opposition to said exposure aperture, said photographic film being supported on said film pressure plate, said magnetic head being mounted on said film pressure plate;

at least one pressure roller disposed in opposition to said magnetic head so as to press said magnetic recording layer into contact with said head surface, the centerline of said magnetic head being offset, in the direction of advancement of said photographic film, with respect to the centerline of said pressure roller;

said camera being configured so as to satisfy the following equations;

$$10 \text{ mm} \leq Rh \leq 15 \text{ mm},$$

$$5 \text{ mm} \leq Rr \leq 12 \text{ mm},$$

$$10 \text{ g} \leq P \leq 100 \text{ g, and}$$

$$0 \text{ mm} \leq M \leq 0.2 \text{ m}$$

where Rh is the radius of curvature of said head surface, Rr is the diameter of said pressure roller, P is a pressure at which said pressure roller is placed in contact with said head surface and M is a distance, in the direction normal to said recording layer of the photographic film, between intersections of said head surface with the respective centerlines of said magnetic head and said pressure roller.

7. A camera having a magnetic head for magnetically reading and writing information while a head surface of said magnetic head is in contact with a magnetic recording layer of a photographic film, said camera comprising:

a cassette housing chamber defined in said camera and adapted to receiving a cassette containing said photographic film;

a film take-up chamber defined in said camera and adapted to receiving portions of said photographic film which have been pulled out of said cassette;

a motor disposed in said film take-up chamber for pulling said film out of said cassette;

a film passageway defined in said camera and extending between said cassette housing chamber and said film take-up chamber;

an exposure aperture formed in said camera so as to communicate with said film passageway;

a film pressure plate disposed in said film passageway and in opposition to said exposure aperture, said photographic film being supported on said film pressure plate, said magnetic head being mounted on said film pressure plate;

at least one pressure roller mounted on said spring plate so as to be disposed in opposition to said magnetic head so as to press said magnetic recording layer into contact with said head surface; and magnetic shielding means disposed between said film take-up chamber and said magnetic head so as to shield said magnetic head from a magnetic field generated by said motor.

8. A magnetic recording/reproducing apparatus for a camera, comprising:
- a film pressure plate across which a photographic film moves as the photographic film is advanced through said camera, the photographic film including at least first and second sides, the first side comprising a magnetic recording layer;
- a magnetic head mounted on said pressure plate having a head surface which is placed in contact with the magnetic recording layer of the photographic film through an opening formed in said film pressure plate;
- a rotatable pressure roller disposed in opposition to said magnetic head so as to push the photographic film towards said magnetic head by virtue of contact between said pressure roller and the second side of the photographic film; and
- an encoder coupled to said pressure roller so as to rotate along with said pressure roller and output a pulse when the photographic film is advanced by a predetermined amount.

9. A camera having a magnetic head for magnetically reading and writing information while a head surface of the magnetic head is in contact with a magnetic recording layer of a photographic film, said camera further comprising:
- supporting means for supporting the magnetic head, said supporting means comprising a shaft extending in a direction parallel to the direction of advancement of the photographic film, said magnetic head being rotatably mounted on said shaft;
- a film pressure plate for pushing the back surface of the photographic film, said supporting means being mounted on the back side of said film pressure plate, said head surface protruding from an opening formed in said film pressure plate;
- a spring plate extending in a direction of advancement of said photograph film;
- at least one pressure roller for pushing the photographic film toward said magnetic head so as to keep the magnetic recording layer in contact with the magnetic head, said pressure roller being mounted on said spring plate;
- said magnetic recording layer being formed on a back surface of the photographic film opposite to a surface having a photographic emulsion layer formed thereon;
- an encoder driven by rotation of said pressure roller for generating a pulse each time the photographic film is advanced by a predetermined amount; and
- a cross section of the head surface having an arcuate shape.

10. A camera having a magnetic head for magnetically reading and writing information while a head surface of the magnetic head is in contact with a magnetic recording layer of a photographic film, said camera further comprising:
- supporting means for supporting the magnetic head, said supporting means comprising a shaft extending in a direction parallel to the direction of advancement of the photographic film, said magnetic head being rotatably mounted on said shaft;
- a film pressure plate for pushing the back surface of the photographic film, said supporting means being mounted on the back side of said film pressure plate, said head surface protruding from an opening formed in said film pressure plate;
- a spring plate extending in a direction of advancement of said photograph film;
- at least one pressure roller for pushing the photographic film toward said magnetic head so as to keep the magnetic recording layer in contact with the magnetic head, said pressure roller being mounted on said spring plate;
- said magnetic recording layer being formed on a back surface of the photographic film opposite to a surface having a photographic emulsion layer formed thereon;
- an encoder driven by rotation of said pressure roller for generating a pulse each time the photographic film is advanced by a predetermined amount, said magnetic head reads information from, and writes information to, the magnetic recording layer synchronously with the pulse; and
- a cross section of the head surface having an arcuate shape.

11. A camera having a magnetic head for magnetically reading and writing information while a head surface of the magnetic head is in contact with a magnetic recording layer of a photographic film, said camera comprising:
- a cassette housing chamber for receiving a cassette containing the photographic film;
- a film take-up chamber for taking up the photographic film pulled out of said cassette;
- a film passageway formed between said cassette housing chamber and said film take-up chamber;
- an exposure aperture formed at said film passageway for exposing the photographic film, said magnetic head being disposed at a side of said exposure aperture;
- a film pressure plate disposed at the back of said exposure aperture for pushing said photographic film, the magnetic head being mounted on said film pressure plate; and
- a spring plate extending in a direction of advancement of the photographic film;
- at least one pressure roller for pushing the photographic film toward the magnetic head so as to keep the magnetic recording layer in contract with the magnetic head, said pressure roller being mounted on said spring plate;
- magnetic shielding means disposed between said film take-up chamber and the magnetic head for shielding a magnetic field generated by a motor mounted within said film take-up chamber;
- the cross section of the head surface having an arcuate shape; and
- said magnetic recording layer being formed on a back surface of the photographic film and a photosensitive emulsion layer being formed on a front surface of the photographic film.

12. A camera having a magnetic head for magnetically reading and writing information while a head surface of the magnetic head is in contact with a magnetic recording layer of a photographic film, said camera comprising:
- a cassette housing chamber for receiving a cassette containing the photographic film;

a film take-up chamber for taking up the photographic film pulled out of said cassette;

a film passageway formed between said cassette housing chamber and said film take-up chamber;

an exposure aperture formed at said film passageway for exposing the photographic film, said magnetic head being disposed at a side of said exposure aperture;

a film pressure plate disposed at the back of said exposure aperture for pushing said photographic film, the magnetic head being mounted on said film pressure plate; and a spring plate extending in a direction of advancement of the photographic film;

at least one pressure roller for pushing the photographic film toward the magnetic head so as to keep the magnetic recording layer in contract with the magnetic head, said pressure roller being mounted on said spring plate;

the cross section of the head surface having an arcuate shape and a center line of the head surface and a center line of said pressure roller are displaced from each other;

said magnetic recording layer being formed on a back surface of the photographic film and a photosensitive emulsion layer being formed on a front surface of the photographic film; and said camera further satisfying the following equations:

$Rh = 10$ mm to 15 mm, $Rr = 5$ mm to 12 mm, $L = -0.2$ mm to $+1.0$ mm (wherein + represents downstream in the direction of advancement of the photographic film, and − represents upstream), and $P = 10$ g to 100 g, where Rh represents the radius of the head surface, Rr represents the diameter of said pressure roller, P represents the pressure of said pressure roller applied to the head surface, and L represents a displacement amount in the direction of advancement of the photographic film between the center line of the head surface and the center line of said pressure roller.

13. A camera having a magnetic head for magnetically reading and writing information while a head surface of the magnetic head is in contact with a magnetic recording layer of a photographic film, said camera comprising:

a cassette housing chamber for receiving a cassette containing the photographic film;

a film take-up chamber for taking up the photographic film pulled out of said cassette;

a film passageway formed between said cassette housing chamber and said film take-up chamber;

an exposure aperture formed at said film passageway for exposing the phonographic film, said magnetic head being disposed at a side of said exposure aperture;

a film pressure plate disposed at the back of said exposure aperture for pushing said photographic film, the magnetic head being mounted on said film pressure plate; and a spring plate extending in a direction of advancement of the photographic film;

at least one pressure roller for pushing the photographic film toward the magnetic head so as to keep the magnetic recording layer in contract with the magnetic head, said pressure roller being mounted on said spring plate;

the cross section of the head surface having an arcuate shape and a center line of the head surface and a center line of said pressure roller are displaced from each other;

said magnetic recording layer being formed on a back surface of the photographic film and a photosensitive emulsion layer being formed on a front surface of the photographic film; and said camera further satisfying the following equations:

$Rh = 10$ mm to 15 mm, $Rr = 5$ mm to 12 mm, $P$ 10 g to 100 g, and $M$ 0 to 0.2 mm, where Rh represents the radius of the head surface, Rr represents the diameter of said pressure roller, P represents the pressure of said pressure roller applied to said the surface, and M represents a distance in the direction perpendicular to the direction of advancement of the photographic film between intersections of the head surface with the center lines of the head surface and said pressure roller.

14. A magnetic recording/reproducing apparatus for a camera, comprising:

a film pressure plate across which a photographic film being advanced moves, the photographic film including at least first and second sides, the first side comprising a magnetic recording layer;

a magnetic head having a head surface which contacts the magnetic recording layer of the photographic film through an opening in said film pressure plate for reading/writing data to/from the magnetic recording layer of the photographic film; and a rotatable pressure roller for pushing the photographic film towards said magnetic head from the second side substantially across from said magnetic head;

an encoder driven by rotation of said rotatable pressure roller for generating a pulse each time the photographic film is advanced by a predetermined amount.

\* \* \* \* \*